(12) United States Patent
Wang (10) Patent No.: US 11,507,171 B2
(45) Date of Patent: Nov. 22, 2022

(54) ELECTRONIC DEVICE AND CONTROL METHOD (71) Applicant: Lenovo (Beijing) Co., Ltd., Beijing (CN)

(72) Inventor: Huan Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 449 days.

(21) Appl. No.: 16/393,045

(22) Filed: Apr. 24, 2019

(65) Prior Publication Data
US 2019/0324521 A1 Oct. 24, 2019

(30) Foreign Application Priority Data
Apr. 24, 2018 (CN) .......................... 201810374443.5

(51) Int. Cl.
G06F 1/00 (2006.01)
G06F 1/3234 (2019.01)
(Continued)

(52) U.S. Cl.
CPC .......... *G06F 1/3234* (2013.01); *G06F 1/1616* (2013.01); *G06F 1/1624* (2013.01); *G06F 1/1626* (2013.01); *G06F 1/1637* (2013.01); *G06F 1/3265* (2013.01); *G06F 1/3293* (2013.01); *H04M 1/0227* (2013.01); *H04M 1/0233* (2013.01); *H04M 1/0245* (2013.01); *H04W 52/0254* (2013.01); *H04M 1/0225* (2013.01)

(58) Field of Classification Search
CPC .... G06F 1/1616; G06F 1/1626; G06F 1/1637; G06F 1/3234; G06F 1/3293; G06F 1/1624; G06F 1/1677; G06F 1/1686; G06F 1/1694; G06F 1/3215; G06F 1/3265; G06F 1/3287; H04M 1/0225; H04M 1/0227; H04M 1/0233; H04M 1/0245; H04W 52/0254; Y02D 10/00
See application file for complete search history.

(56) References Cited

U.S. PATENT DOCUMENTS

2005/0038982 A1* 2/2005 Park .................. G06F 1/206
713/1
2006/0294402 A1* 12/2006 Poisner ............... G06F 1/3203
713/300
(Continued)

FOREIGN PATENT DOCUMENTS

CN 1779877 A 5/2006
CN 102498452 A 6/2012
(Continued)

*Primary Examiner* — Zhipeng Wang
(74) *Attorney, Agent, or Firm* — Anova Law Group, PLLC (57) ABSTRACT An electronic device includes a first body, a second body coupled to the first body, a trigger device, and a processing device. The trigger device is configured to generate a trigger instruction based on a trigger operation. The trigger device is placed in an area that is responsive to a movement of the first body relative to the second body. The processing device is configured to switch the electronic device from a first state to a second state in response to the trigger instruction. A power consumption state of the first state is different from a power consumption state of the second state.

20 Claims, 5 Drawing Sheets (51) Int. Cl.
    *G06F 1/16*     (2006.01)
    *G06F 1/3293*     (2019.01)
    *H04W 52/02*     (2009.01)
    *H04M 1/02*     (2006.01)

(56) References Cited

U.S. PATENT DOCUMENTS

| | | | | |
|---|---|---|---|---|
| 2009/0058578 | A1* | 3/2009 | Huang | H04M 1/0245 335/205 |
| 2009/0251512 | A1* | 10/2009 | Nozawa | B41J 2/1752 347/86 |
| 2010/0052660 | A1* | 3/2010 | Wang | H04W 52/0274 455/575.4 |
| 2014/0009051 | A1* | 1/2014 | Liu | H05K 5/0221 292/96 |
| 2014/0031088 | A1* | 1/2014 | Nakamura | G06F 1/1616 455/566 |
| 2016/0337595 | A1* | 11/2016 | Kim | H04N 5/23245 |
| 2017/0010657 | A1* | 1/2017 | Schneider | G01B 5/24 |
| 2020/0050343 | A1* | 2/2020 | Hama | G06F 3/04842 |
| 2021/0200842 | A1* | 7/2021 | Sakumoto | G06V 40/70 |
| 2021/0208721 | A1* | 7/2021 | Lee | G06F 3/0416 |

FOREIGN PATENT DOCUMENTS

| | | |
|---|---|---|
| CN | 202649887 U | 1/2013 |
| CN | 107567607 A | 1/2018 |
| JP | 6189990 B1 | 8/2017 |
| WO | 2008025367 A1 | 3/2008 |

\* cited by examiner

ELECTRONIC DEVICE AND CONTROL METHOD

CROSS-REFERENCE TO RELATED APPLICATION

This application claims the priority of Chinese Patent Application No. 201810374443.5, filed on Apr. 24, 2018, the entire content of which is incorporated herein by reference.

TECHNICAL FIELD

The present disclosure relates to the field of electronic device technology and, in particular, to an electronic device and a control method.

BACKGROUND

With the development and diversification of electronic devices, more and more users use electronic devices for working and learning purposes. When using an electronic device, a user may need to switch the power consumption state of the electronic device to meet the user's demand.

Generally, before switching the power consumption state of the electronic device, the user may need to first switch a state of the electronic device. Such operations increase the wait time for the user to switch among different states of the electronic device, which makes the user experience less friendly.

SUMMARY

In accordance with the disclosure, one aspect of the present disclosure provides an electronic device including a first body, a second body coupled to the first body, a trigger device, and a processing device. The trigger device is configured to generate a trigger instruction based on a trigger operation. The trigger device is placed in an area responsive to a movement of the first body relative to the second body. The processing device is configured to switch the electronic device from a first state to a second state in response to the trigger instruction. A power consumption state of the first state is different from a power consumption state of the second state.

In accordance with the disclosure, another aspect of the present disclosure provides a control method. The control method includes obtaining a trigger instruction from a trigger device of an electronic device, and switching the electronic device from a first state to a second state in response to the trigger instruction. The electronic device includes a first body and a second body coupled to the first body. The trigger device is placed in an area responsive to a movement of the first body relative to the second body. A power consumption state of the first state is different from a power consumption state of the second state.

The present disclosure provides an electronic device and a control method. The electronic device has a trigger device, and the trigger device is placed an area that after subjected to an external force can cause a first body of the electronic device and a second body of the electronic device to move relative to each other (e.g., an area responsive to a movement of the first body and second body). A trigger instruction can be generated by the trigger device when the two bodies (e.g., the first body and the second body) of the electronic device switches their positions, and the trigger instruction can case the power consumption state of the electronic device to be switched. As such, the switching between relative positions of the two bodies and the switch between the power consumption states can be trigged by one trigger operation. Therefore, users' wait time can be reduced, thereby improving users' experience.

DESCRIPTION OF THE DRAWINGS

Drawings used in the embodiments are briefly described below. The drawings described below are only some embodiments of the present disclosure, and those skilled in the art can obtain other drawings according to the provided drawings without any creative work.

DETAILED DESCRIPTION

The technical solutions in the embodiments of the present disclosure are described in the following with reference to the drawings in the embodiments of the present disclosure. The described embodiments are only a part of the embodiments of the present disclosure, and not all of the embodiments. All other embodiments obtained by a person of ordinary skill in the art based on the embodiments of the present disclosure without departing from the inventive scope shall fall in the scope of the present disclosure.

The electronic device provided in the embodiment of the present disclosure is intended to solve the problem that the wait time is long during the power state switching process before the electronic device can be used in the conventional technology. The electronic device may be, but is not limited to, a terminal device such as a laptop computer, an e-book, or a mobile terminal, etc., that includes two bodies. The electronic device includes two bodies, and the two bodies can form a plurality of positions of the electronic device by relative movement (e.g., a movement of one of the two bodies relative to another). For example, when the electronic device is in a closed position, an overlapping area of the two bodies is the largest. When the electronic device is in an unfolded state, an angle between the two bodies meets the user's need to operate the electronic device.

Figure 1:
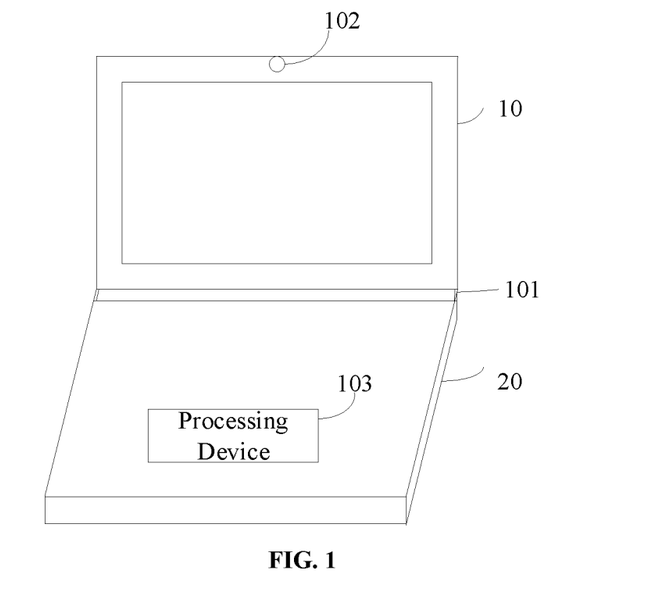
FIG. 1 is a schematic structural diagram of an electronic device according to some embodiments of the present disclosure.

FIG. 1 is a schematic structural diagram of an electronic device according to some embodiments of the present disclosure. The electronic device includes a first body 10, a connecting device 101, a second body 20, a trigger device 102, and a processing device 103. The connecting device 101 is connected to the first body 10, and the second body 20 connected to the connecting device 101. The second body 20 is movable relative to the first body 10 via the connecting device 101. The trigger device 102 is placed in a preset area and configured to generate a trigger instruction based on a trigger operation, where the preset area is an area that after subjected to an external force can cause the first body 10 and the second body 20 to move relative to each other. The processing device 103 is configured to switch the electronic device from a first state to a second state in response to at least the trigger instruction, where a power consumption state of the first state and a power consumption state of the second state are different.

In the electronic device, the two bodies may have a plurality of representations. For example, when the body is described by the function of the body, the body may include a display body, an operating body, a protection body, etc. The display body may include a display device. The operating body may include a keyboard, a tablet or other form of an input device. The protection body can be described in the form of a protection housing. There may be other representations of the two bodies. In some embodiments, the representation of the first body 10 and the representation of the second body 20 may be same or different. In one example, when the first body 10 is a display body, the second body 20 can also be a display body. In another example, when the first body 10 is a display body, the second body 20 can be an operation body. In further another example, when the first body 10 is a display body, the second body 20 can be a protection body.

The first body 10 may be connected to the second body 20. In some embodiments, the second body 20 can be moved relative to the first body 10 via the connecting device 101. The movement of the second body 20 relative to the first body 10 may include moving, rotating, sliding, and rolling, etc. Correspondingly, the connecting device 101 may include one or more of the following: a moving device, a rotating device, a sliding device, or a connecting rolling device, etc. In some embodiments, the two bodies, for example, a laptop computer, an e-book, and a sliding mobile terminal, etc., may have a plane shape. The movement of the two bodies relative to each other can be defined by an angle between the two bodies or a relative distance from a reference position. In some embodiments, the electronic device can realize different postures of the first body 10 and the second body 20 through the relative movements (e.g., movements of one of the two bodies relative to another) between the two bodies, for example, a relative vertical posture between the two bodies, a tile posture between the two bodies, and a closed posture between the two bodies. The posture between the two bodies can be defined by the angle between the two bodies. For example, when the angle between the two bodies equals zero or smaller than an angle threshold, the position between the two bodies can be considered as the closed position.

In addition, for two bodies that have special shapes, the movement of the connecting device may not cause the angle or relative distance between the two bodies to change. An initial position and a target position if the two bodies can be used to determine whether the relative movement (e.g., the movement of one of the two bodies relative to another) between the two bodies has occurred. For example, the two bodies may be cylindrical structures stacked on top of each other, and the two bodies are in contact with each other and can rotate relative to each other. In some embodiments, the first body may include a display screen, and the second body may include a keyboard. When the electronic device is not in use, the display screen of the first body and the keyboard of the second body may be hidden from the user. In this case, the electronic device is in the initial position. To use the electronic device, the user can roll the first body and the second body to have the display screen of the first body and the keyboard of the second body exposed to the outside and are placed at positions where it is convenient for the user to use. In this case, the electronic device is in the target position. As such, the electronic device can determine the relative movement (e.g., the movement of one of the two bodies relative to another) between the two bodies of the electronic device through the exposed position of the display screen of the first body or the exposed position of the keyboard of the second body can be used to determine.

In some other embodiments, the first body of the electronic device may be a display body, and the second body is a protective casing. When the electronic device is not in use, the first body is hidden, for example, the second body is located on an upper surface of the first body. To use the electronic device, the user can push up and hide a blocking area of the second body, so that the display screen of first body can be exposed. In this case, the two bodies are not moved and the angle therebetween is not changed, but a position of the blocking area of the second body is changed. Thus, the relative movement (e.g., the movement of one of the two bodies relative to another) between the two bodies can be determined by detecting a change of the position of the blocking area of the second body.

The trigger device 102 is placed in a preset area. The preset area is an area that after subjected to an external force can cause the first body 10 and the second body 20 to move relative to each other. In some embodiments, the external force may from a user of the electronic device. Correspondingly, the preset area may be an area that can be touched by the user to cause the first body and the second body to move relative to each other. In some other embodiments, the external force may from a trigger device that can cause the first body and the second body of the electronic device to move relative to each other. For example, when the first body is the display body and there is a flip motor coupled to the display body, the preset area may be located in a trigger area of the flip motor.

For example, if the external force is from the user of the electronic device, when the electronic device is turned off and the two bodies are closed, the relative movement (e.g., the movement of one of the two bodies relative to another) between the two bodies is generated when the user separates the two bodies. The trigger device 102 is placed in an area where the external force is applied to generate the relative movement (e.g., the movement of one of the two bodies relative to another) between the two bodies. When the user separates the two bodies, the trigger device 102 can be triggered, causing the trigger device 102 to generate a trigger instruction and send the trigger instruction to the processing device 102. As such, compared to an existing manner of first flipping and then trigger the power-on button, the user is enabled to turn on the electronic device while the two bodies are opened, thereby saving power-on wait time.

The processing device 103 switches the electrons from the first state to the second state in response to at least the trigger instruction generated by the trigger device 102, and the power consumption state of the first state is different from the power consumption state of the second state are different. The processing device 103 of the electronic device may be in a single processing mode or a multi-processing mode. If the processing device 103 is in the single processing mode, the processing device 103 may only respond to the trigger instruction generated by the response trigger device 102. If the processing device 103 is in the multi-processing mode, the processing device 103 can respond to the trigger instruction generated by the trigger device 102 and trigger instructions from other devices. For example, besides the trigger instruction generated by the trigger device 102, the processing device 103 may respond to a brightness adjusting trigger instruction for adjusting a brightness of the screen, or a trigger instruction of a detecting device for detecting the relative movement (e.g., the movement of one of the two bodies relative to another) between the two bodies, etc. The first state and the second state of the electronic device are two different states that are distinguished in the aspect of the power consumption. In some embodiments, the power consumption can be understood as the amount of energy consumed per a unit time. For the electronic device in different states, numbers of software or programs and related devices that are responsive are different, so the energy consumed is different, that is, the power consumption is different. Taking a laptop computer as an example, if the first state of the laptop computer is a power-on state, it can be understood that the electronic device in the power-on state has more programs to be run or running, and the power consumption thereof is larger. A second state in which the power consumption is different from the power consumption of the power-on state may be a standby state or a power-off state of the laptop computer.

The processing device 103 can switch the electronic device from the first state to the second state. If the second state corresponding to the first state is at least one, the target second state that is switched to may be a preset second state. The preset second state may be determined by a factory initialization of the electronic device or may be determined by personalized settings of the user of the electronic device. For example, the first state of the electronic device can be the power-on state, and the second state may be the standby state or the power-off state. If the user does not perform the personalized setting of the second state of the electronic device, the processing device 103 can switched from the power-on state to the power-off state by default after the processing device 103 obtains the trigger instruction. If the user set the second state corresponding to the power-on state as the standby state, the processing device 103 can switch the electronic device from the power-on state to the standby state after the processing device 103 obtains the trigger instruction.

The electronic device in the existing technologies needs to perform the position switching and the power consumption state switching before the electronic device can be used. The position switching and the power consumption state switching are performed successively. For example, the switching of the position of the two bodies of the electronic device is performed before the switching of the power consumption state is performed. Thus, the wait time of the electronic device before the electronic device can be used can be a sum of a first time length for switching the position and a second time length for switching the power consumption state. For the electronic device according to some embodiments of the present disclosure, the electronic device includes the trigger device, and the trigger device is placed in an area that after subjected to an external force can cause a first body of the electronic device and a second body of the electronic device to move relative to each other. A trigger instruction can be generated by the trigger device when the two bodies (the first body and the second body) of the electronic device switches their positions, and the trigger instruction can case the power consumption state of the electronic device to be switched. As such, the switching between relative positions of the two bodies and the switch between the power consumption states can be trigged by one trigger operation. Therefore, users' wait time can be reduced, thereby improving users' experience.

It should be noted that, in the embodiment of the present disclosure, the first time length and the second time length may parallel or at least partially parallel with each other. In order to minimize the user's wait time, the overlapping time is as much as possible.

Figure 2:
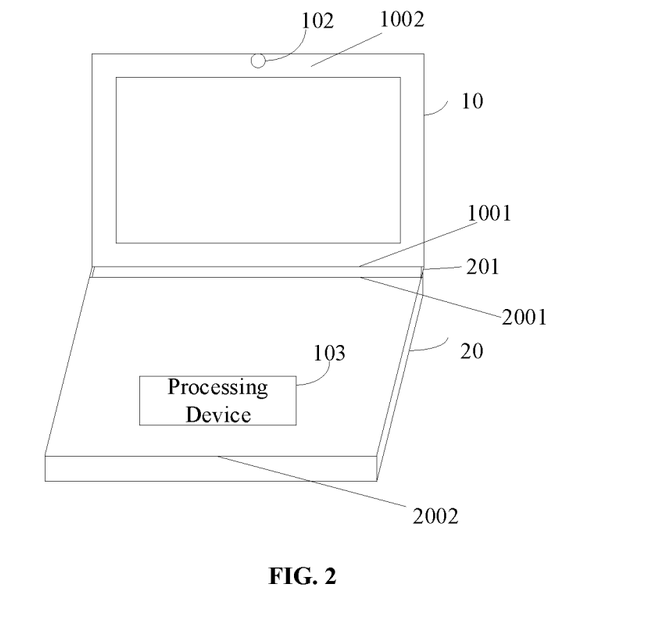
FIG. 2 is a schematic structural diagram of an electronic device according to some other embodiments of the present disclosure.

FIG. 2 is a schematic structural diagram of an electronic device according to some other embodiments of the present disclosure. The electronic device includes a first body 10, a second body 20, a trigger device 102, and a processing device 103. The connecting device includes a rotating device 201.

The rotating device 201 is coupled to a first portion of the first body 10 such that the first body 10 is rotatable relative to the second body 20 by the rotating device 201.

When the rotating device 201 rotates, the first body 10 rotates relative to the second body 20, thereby achieving various positions of the first body 10 and the second body 20, for example, a relative vertical position between the two bodies, a tiled position between the two bodies, and a closed position between the two bodies.

When the rotating device 201 is coupled to the first portion of the first body 10, a preset area may be placed at a second portion of the first body 10. The second portion and the first portion meet a preset relative positional requirement. An external force is more likely to act on the second portion to cause the first body and the second body to produce relative movement (e.g., the movement of one of the two bodies relative to another), so that the second portion may be considered as the preset area. A relative positional requirement met by the first portion and the second portion may include a distance positional requirement and an angular positional requirement. For example, to achieve a relative positional requirement between the first body and the second body, a distance threshold may be sent for the first portion and the second portion, or an angle threshold between the first portion and the second portion may be set for the first portion and the second portion. The setting of the preset threshold needs to consider a condition for satisfying the utilization of the external force.

The preset area in the electronic device in the present disclosure is an area in which the external force utilization rate in the plurality of areas where the first body and the second body are relatively moved by the external force satisfy the condition. The actual utilization of external force in this application needs to consider following aspects. For example, a first aspect may be a proportion of the force used to change the position of the two bodies to the total external force. A second aspect may be a correspondence relationship between the external force and a result of the position change of the two bodies. For example, subjected to the same external force, the larger the amplitude of the result of the position change, the higher the utilization rate of the external force.

When determining the force in the external force that causes the position changes of the two bodies in the first aspect, it is necessary to consider a force acting behavior of the external force, such as an action point of the external force and a direction of the external force. For example, if the two bodies of the electronic device are connected by a sliding connecting device, the initial position of the electronic device may be that the two bodies are completely overlapped, and the target position may be that the two bodies are slidably separated. If the external forces are respectively applied to the first portion and the second portion of the first body, the directions of the external force applied on the two portions of the first body may be different. In this case, proportions of the external forces acting on the two bodies to separate the two bodies to the total external force are different. Thus, an area with higher proportion can be considered as a candidate area for the preset area. In another example, the connecting device between the two bodies can be rotating device, and the first aspect can be measured by a torque. The torque can be used to characterize a tendency of the force to rotate the object around a rotating shaft or a fulcrum. The external force can act on a left side portion and a right side portion of the left side and a right side of the electronic device, respectively, and a second side portion that is opposite to the side connected to the rotating shaft. According to a calculation method of the torque, a torque at the second side portion is greater than a toque of the left side portion and a torque of the right portion. For example, a proportion of an effective force to the external force in the second side portion may be relatively large. As such, the user may feel that compared to the left side portion and the right side portion, it is easier to apply a force to the second side portion to open the closed two bodies of the electronic device.

Therefore, when determining the preset area according to the utilization rate of the external force, it is necessary to consider the second aspect, that is, the correspondence relationship between the external force and a result of the position change of the two bodies. For example, subjected to the same external force, the larger the amplitude of the result of the position change, the higher the utilization rate of the external force. Therefore, the preset condition that the external force utilization rate needs to be met may be set according to the second aspect, where the preset condition may be that the external force utilization rate is the highest, or is higher than a certain preset threshold, or is higher than the predetermined ranking. For example, the external force acting region may include three regions A, B, and C. If the preset condition is that an external force conversion rate is the highest, that is, the amplitude of the two bodies' position conversion results is the largest. For example, the initial position of the two bodies is the angle between the two bodies is 0 degree. When the same external force acts on the three regions A, B and C, respectively, if the angle between the two bodies reaches 60 degrees when the external force acts on the A region, the angle between the two bodies reaches 45 degrees when the external force acts on the B region, if the angle between the two bodies reaches 30 degrees when the external force acts on the C region, that is, the amplitude of the two bodies' position conversion results in the A area is the largest, thus the preset area may be set in the A area in this example.

In some embodiments, the body of the electronic device may have a plane shape, or a curved surface shape. For the body of the electronic device having different shapes, the layout positions of the connecting devices of the electronic devices may be different, as such the preset area of the trigger device may be different.

In some embodiments, the electronic device includes bodies having a plane shape. Referring to FIG. 2, if the first body 10 has a plane shape, the first portion is the first side portion 1001 of the first body 10 and the second portion is the second side portion 1002 corresponding to the first side portion 1001, the second body 20 has a plane shape and includes a third side portion 2001. The side portion may be an edge portion of the body, or a strip-shaped solid region having a certain width distance from an outer edge of the frame along the outer edge of the frame. For example, for the electronic device having a plane shape, the side portion of the body that includes a display screen can be an outer side portion of the display screen, and the outer side portion may be divided into four side portions corresponding to four edges of the display screen. For example, the first side portion can be a strip-shaped solid region having a 1 cm width measured from a connecting edge between the first body and the connecting device. That is, the first side portion can be a cuboid having a width of 1 cm, a length consistent with a length of the connecting edge between the first body and the connecting device, and a thickness consistent with a thickness of the first body. The third side portion can have the same scale as the first side portion. Referring to FIG. 2, the first side portion 1001 can be a side of the first body of the electronic device connected to the connecting device 201. If a preset relative positional requirement between the second side portion 1002 and the first side portion 1001 is that a distance between the first side portion 1001 and the second side portion 1002 is larger than a height of the display device of the first body, the second portion can be a side portion that is opposite to the first side portion. In some embodiments, the second side portion 1002 may include other devices such as a camera, etc. In this case, the trigger device 102 may be placed in the second side portion 1002.

The relative movement (e.g., the movement of one of the first body 10 and the second body 20 relative to another) between the first body 10 and the second body 20 may include the two bodies moving from a first relative position to a second relative position. The first relative position may be a state that the angle between the first body 10 and the second body 20 is lower than a threshold, and the second relative position may be a state that the angle between the first body 10 and the second body 20 is larger than the threshold. The first power consumption of the first state is lower than the second power consumption of the second state.

The angle threshold between the two bodies can be set according to the actual situation. For example, the angle threshold can be set as 10 degrees, 30 degrees, or 45 degrees, etc. For example, the angle threshold is 10 degrees between the two bodies. If the initial angle between the two bodies is smaller than 10 degrees, the two bodies are in the first relative position. Under the external force, the electronic device moves from the first relative position to a second relative position. In the second relative position, the angle between the two bodies is larger than 10 degrees. The trigger device 102 is placed in the trigger area of the external force. When the relative position of the two bodies changes, the trigger device 102 can simultaneously generate the trigger instruction. In response to the trigger instruction, the processing device 103 can switch the electronic device from the first state to the second state, and the first power consumption of the first state is lower than the second power consumption of the second state. In some embodiments, when the two bodies of the electronic device are in the closed state, when the first body is flipped by the external force, the trigger dive 102 can be triggered, causing the electronic device to switch from the closed state to the power-on state.

In some embodiments, if the two bodies are moved from the second relative position to the first relative position, the processing device 103 can switch the electronic device from the second state to the first state in response to the trigger instruction of the trigger device 102, where the first power consumption of the first state is larger than the second power consumption of the second state. For example, when the laptop computer is switched from the power-on state to the power-off state or the standby state. The first relative position of the two bodies may be the closed state, and the second relative position may be the open state.

In some embodiments, the first body 10 includes a display device. When the angle between the first side portion 1001 and the third side portion 2001 is greater than a threshold, that is, the first body is in an open state relative to the second body, and the display device is in an exposed state. In this case, the trigger device 102 is placed at the second side portion 1002 and on a surface of the second side portion 1002 where the display device is located. As such, in one aspect, the utilization efficiency of the external force can be relatively high. In another aspect, when the display device is exposed, that is, the electronic device is in the open state, the user may apply a force on a surface of the first body where the display device is not located. The trigger device 102 is placed on the surface of the first body where the display device is located, so that it can be realized that the trigger device 102 is not triggered when the two bodies are closed, thereby realizing a normal standby state of the electronic device. As such, the problem that the electronic device is accidentally turned off when the first body is closed relative to the second body can be avoided.

In order to ensure that the user's experience is higher, two trigger devices may be provided and can be set according to the action area of the external force. In some embodiments, the trigger device includes a first trigger device and a second trigger device. If the first body 10 includes the display device, the first trigger device can be placed at the second side portion 1002 and on the surface of the second side portion 1002 where the display device is located. The first trigger device is configured to generate a trigger instruction (e.g., a first trigger instruction) for switching the electronic device to a state in which the power consumption is increased, e.g., switching the electronic device from the power-off state to a power-on state. The second trigger device is placed at the second side portion and on a surface where the display device is not located. The second trigger device is configured to generate a trigger instruction (e.g., a second trigger instruction) for switching the electronic device from the electronic device to a state in which the power consumption is reduced, for example, switching the electronic device from the power-on state to the power-off state.

In some embodiments, the display device may be used as a reference for the preset area. In the electronic device that includes the display device, the display device is hidden when the electronic device is in a closed state (the angle between the first side portion and the third side portion is smaller than a threshold). The display device needs to be exposed for convenience of use. Thus, the first trigger device can be placed on the surface of the second side portion where the display device is located, which is more in line with the action area of the external force. Similarly, the arrangement of the second trigger may also be more in line with the action area of the external force.

Therefore, by setting the positions of the first trigger device and the second trigger device in different areas, it is possible to complete the power-on by the first trigger device and the shutdown by the second trigger device according to the usage habits of most users, to meet the user's experience needs.

In some embodiments, the electronic device can be configured with two trigger devices as described above. The two trigger devices may be placed on a same surface. In some other embodiments, the electronic device can be configured with other numbers of trigger devices, for example, the electronic device can be configured with three trigger devices (e.g., a first trigger device, a second trigger device, and a third trigger device). The first trigger device can be configured to generate a trigger instruction (e.g., a first trigger instruction) for switching the electronic device from the power-on state to the power-off state. The second trigger device can be configured to generate a trigger instruction (e.g., a second trigger instruction) for switching the electronic device from the power-off state to the power-on state. The third trigger device can be configured to generate a trigger instruction (e.g., a third trigger instruction) for switching the electronic device from the power-on state to the standby state.

Figure 3:
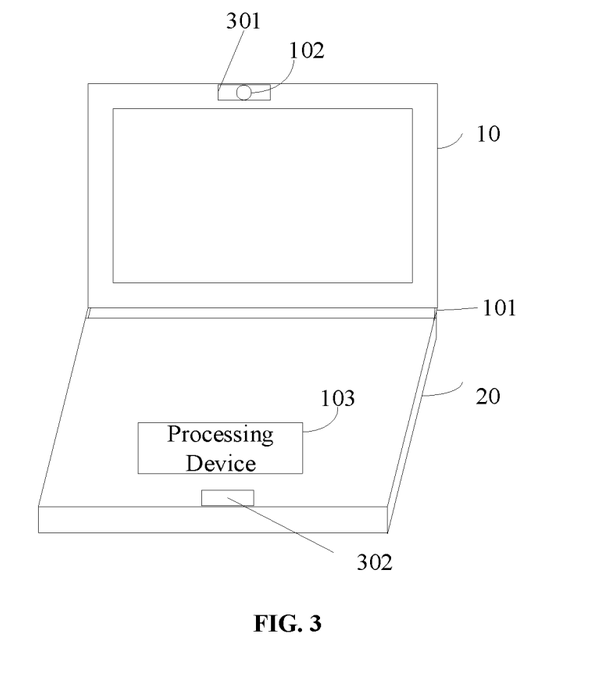
FIG. 3 is a schematic structural diagram of an electronic device according to some other embodiments of the present disclosure.

FIG. 3 a schematic structural diagram of an electronic device according to some other embodiments of the present disclosure. The electronic device includes the first body 10, the second body 20, the connecting device 101, the trigger device 102, and the processing device 103. The electronic device further includes a locking device 201 placed at the second side portion of the first body 10, and a coupling device 302 located at a forth side portion of the second portion corresponding to the second body 20.

At this time, the connecting device 101 connects the first side portion of the first body 10 to the third side portion of the second body 20, such that the first body 10 can move relative to the second body 20 via the connecting device 101

The second side portion and the fourth side portion may be arranged corresponding to each other (e.g., the second side portion and the fourth side portion meet a corresponding positional requirement), so that the locking device 301 and the coupling device 302 can be used in cooperation with each other. For example, the coupling device 302 may be located at the fourth side portion and can be in cooperation with the locking device 301 that is placed at any position at the second side portion. The corresponding positional requirement may be defined by relative areas of the two side portions when the overlapping areas of the two bodies are the largest, e.g., when the two bodies are closed. For example, the corresponding positional requirement may be when the two bodies are closed, the relative areas of the side portions are equal to each other, or the relative areas of the side portions is smaller than a certain threshold. The above corresponding positional requirements are only some examples of the present disclosure, and there may be other forms of corresponding positional requirements, which are not described in detail herein. These corresponding positional requirements can enable the corresponding locking device and the coupling device to be used in cooperation with each other.

The locking device 301 and the coupling device 302 are used in cooperation with each other, so as to relatively lock the two bodies, for example, lock the positions of the two bodies.

The locking device 301 and the coupling device 302 are in cooperation with each other to lock in the overlapping relationship between the first body 10 and the second body 20 when the first body 10 is overlapped with the second body 20 locked in, and the first body 10 and the second body 20 can be prevented from rotating relative to each other. That is, the two bodies are relatively locked by the locking device 301 and the coupling device 302, and the two bodies cannot be opened or moved relative to each other.

Moreover, when subjected to an external force, the locking device 301 can be switched from a first position to a second position. In the first position, the locking device 301 can keep the first body 10 and the second body 20 being locked relative to each other. In the second position, the locking device 301 can release the first body 10 and the second body 20 from being locked relative to each other. The first position of the locking device 301 can be a position of the locking device 301 when the two bodies are fixed relative to each other, and the second position of the locking device 301 can be a position of the locking device 301 when the two bodies are released from being locked relative to each other. For example, the locking device 301 may include a push switch structure. When a push element of the push switch structure is in a first position, the bodies are locked relative to each other, and the locking device 301 is in the first position. When the push element of the push switch structure is pushed from the first position to the second position, the two bodies are released from being locked relative to each other, and the locking device 301 is in the second position. For another example, the locking device 301 may include a buckle structure. When the buckle structure is engaged with the coupling device 302, the locking device 301 is in the first position. When the buckle structure is not in contact with the coupling device 302, the locking device 301 is in the second position.

Therefore, the position of the locking device 301 determines whether the two bodies are locked or movable relative to each other. Generally, if the two bodies are in the locked state, to use the electronic device, the user needs to release the two bodies from being locked relative to each other before the user can perform corresponding operations on the electronic device.

In some embodiments, the locking device 301 includes the trigger device 102. When an operation is performed on the locking device 301, the trigger device 102 is triggered to generate the trigger instruction at the same time. The locking device 301 can be placed in the preset area of the first body 10 and the trigger device 102 can also be placed in the preset area. The operation on the locking device 301 can trigger the trigger device 102, so as to realize the relative movement (e.g., the movement of one of the first body 10 and the second body 20 relative to another) between the first body 10 and the second body 20 with a labor-saving operation (e.g., a most efficient operation). For example, the locking device 301 can include the push switch structure. When the user toggles the push switch to switch the two bodies from being locked relative to each other to being movable relative to each other, the trigger device 102 can generate the trigger instruction. The trigger instruction instructs the electronic device to switch the power consumption state. In this way, switching (e.g., releasing or locking) the positions of the electronic device can trigger the trigger device to realize switching the power consumption state of the electronic device, thereby saving the wait time for switching the power consumption state of the electronic device.

In some embodiments of the present disclosure, the electronic device may have a fingerprint recognition function. The user is required to successfully pass fingerprint recognition verification of the electronic device before the user can perform operations on the electronic device. In this case, the trigger device can be placed at the fingerprint recognition device. When the fingerprint recognition is performed, the trigger device can be triggered at the same time to generate the trigger instruction. The trigger instruction can instruct the electronic device to switch from a state in which the power consumption is relatively low to a target state in which the power consumption is relatively high. As such, the electronic device can be triggered to be powered on when the fingerprint recognition verification is performed, thereby saving the wait time for turning on the electronic device.

A device structure commonly found in electronic devices such as mobile communication terminals, handheld game consoles, and e-books is a slide structure. The two bodies of the slide-type electronic device are slidable relative to each other and connected by a sliding device.

Figure 4:
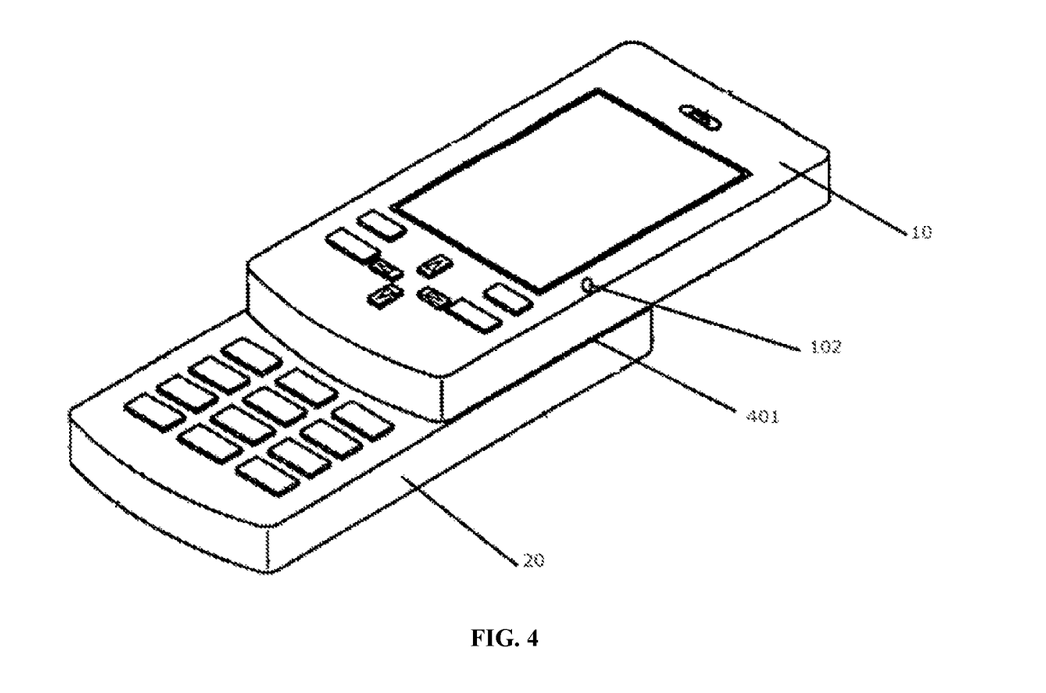
FIG. 4 is a schematic structural diagram of a first position of an electronic device according to some embodiments of the present disclosure.

FIG. 4 is a schematic structural diagram of a first position of an electronic device according to some embodiments of the present disclosure. The electronic device is a mobile communication terminal having a sliding function on the body. For example, the electronic device includes a slide structure. The electronic device includes a first body 10, a second body 20, a trigger device 102, a processing device, and a connecting device. The connecting device includes a sliding device 401. The sliding device 401 is respectively connected to the first body 10 and the second body 20, as such the first body 10 is slidable relative to the second body 20 via the sliding device 401.

Figure 5:
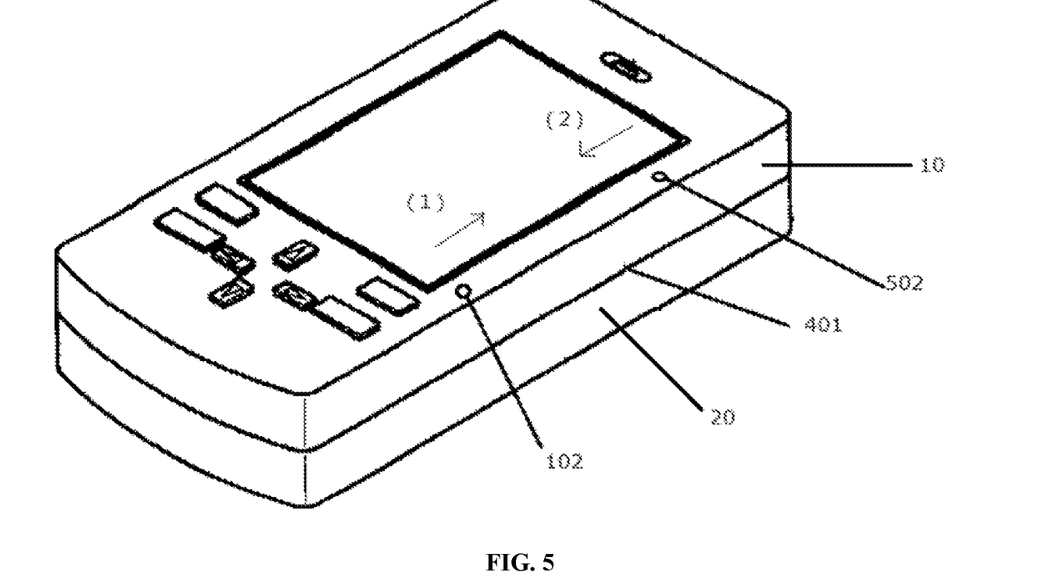
FIG. 5 is a schematic structural diagram of a second position of an electronic device according to some embodiments of the present disclosure.

At this time, the trigger device 102 is disposed on an outer surface of the first body 10. When the two bodies are completely overlapped with each other or the overlapping area is the largest, the electronic device is placed as shown in FIG. 5, and the first body 10 is located above the second body 20. The outer surface of the first body 10 is an upper surface of the first body. 501. Usually, the user slides the upper surface 501 of the first body to slide the first body 10 relative to the second body 20 to achieve a position where the electronic device is operable. Therefore, the trigger device 102 is placed on the upper surface 501 of the first body, as such the power consumption state of the electronic device can be switched when the first body is slide, thereby saving wait time.

In some other embodiments of the present disclosure, the electronic device may further include two trigger devices. Referring to FIG. 5, the electronic device may include a first trigger device 102 and a second trigger device 502.

The first trigger device 102 is placed on an outer surface of the first body and matches a first position of a starting point of a first sliding direction for generating a trigger instruction for switching the electronic device to a state of increased power consumption.

The second trigger device 502 is placed on the outer surface of the first body and matches a second position of the starting point of a second sliding direction for generating a trigger instruction for switching the electronic device to a state of reduced power consumption.

The second sliding direction is a reverse direction of the first sliding direction. The position of the electronic device indicated in FIG. 5 is that the two bodies are closed, and the power consumption of the electronic device is relatively low. Before the electronic device can be operated, the second body needs to be exposed to reach the position shown in FIG. 4. To realize the change of the position of the electronic device, the external force is required to act in the first sliding direction, e.g., a direction indicated by an arrow (1) as shown in FIG. 5, and the electronic device reaches the position shown in FIG. 4. The first trigger device can be set at a starting position of the first sliding direction, so as to achieve the highest utilization rate of the external force. Because compared to trigger time points of other positions along the first sliding direction, the trigger time point of the starting position of the sliding direction can be the earliest time point. Correspondingly, when the electronic device moves from the position in FIG. 4 to the position in FIG. 5, the external force is required to act in the second sliding direction, e.g., a direction indicated by an arrow (2) as shown in FIG. 5. The second trigger device can be placed at a starting position of the second sliding direction, so as to achieve the highest utilization rate of the external force.

For the appearance layout of the electronic device and the user experience, the first position and the second position are required to meet a preset positional requirement. The present positional requirement may include a distance threshold between the first position and the second position and an angle threshold between the first position and the second position. For example, the distance threshold between the first position and the second position can be 2 cm, and the second position can be a position that is more than 2 cm away from the first position. The distance threshold can be determined according to surface area of the first body and a sensitivity of the first body. If the distance threshold between the first position and the second position is too small, an erroneous trigger operation may occur. For example, when the user slides the electronic device along the first sliding direction, the user may touch both the first trigger device 102 and the second trigger device 103, and thus the trigger instruction is inaccurate or unresponsive. The angle threshold between the first position and the second position can be determined according to a structure layout of the electronic device. To ensure minimal influence on the appearance layout of the electronic device or minimal hardware modification, the first trigger device 102 and the second trigger device 502 can be placed on a same straight line, and the angle between the first position and the second position can be 180 degrees.

In some other embodiments of the present disclosure, the second trigger device may be placed on an upper frame of the first body. In this way, the position of the electronic device can be switched (e.g., the electronic device can be slid) when the user pushes the upper frame of the first body, so as to close the two bodies. When the first body and the second body are in an overlapping state, the display device of the first body is located at a middle of the outer surface of the first body. An frame may be arranged at a circumference of the display device of the first body. In order not to affect the display effect, the first trigger device and the second trigger device can be placed on the frame of the first body. If the entire exposed surface of the first body is the display device, e.g., the display device has no frame, the trigger device may be corresponding to the sensing module and placed on the surface of the display device for sensing a user's operation to generate touch instruction.

In a general operation of the slide type mobile communication terminal, the first trigger device can be configured to generate a trigger instruction for instructing the mobile communication terminal to enter the power-on state, and the second trigger device can be configured to generate a trigger instruction for instructing the mobile communication terminal to enter a standby state. In actual applications of the mobile communication terminal, the mobile communication terminal needs to maintain the standby state to ensure normal working and learning. The power-on state can be understood as unlocking the screen for touch operation, or unlocking the keyboard for input operation, etc. The standby state can be understood as locking the screen or locking the keyboard to block the input operation.

The mobile communication terminal may be configured with the third trigger device and the fourth trigger device. The third trigger device may be configured to generate a trigger instruction for instructing the mobile communication terminal to enter a power-off state, and the fourth trigger device may be used to generate a trigger instruction for instructing the mobile communication terminal to enter the power-on state.

In some embodiments, the first body may have a plane shape, and the first body includes a first end portion and a second end portion that meet a preset positional correspondence relationship.

The second body may have a plane shape, and the second body includes a third end portion and a fourth end portion that meet a preset positional correspondence requirement.

The sliding device includes a first sliding end and a second sliding end, and the first sliding end and the second sliding end meet a preset positional correspondence requirement. The first sliding end is respectively coupled to (e.g., connected with) the first end portion and the third end portion, and the second sliding end is respectively coupled to (e.g., connected with) the second end and the fourth end, such that the first body is slidable relative to the second body via the sliding device. The relative movement (e.g., the movement of one of the two bodies relative to another) between the first body and the second body includes moving from the first relative position of the two bodies to the second relative position of the two bodies. The first relative position may be a state in which the overlapping area between the first body and the second body is greater than a threshold, and the second relative position may be a state in which the overlapping area between the first body and the second body is smaller than a threshold.

The threshold is a threshold set according to the overlapping area. When the two bodies are in the first relative position, the overlapping area of the two bodies are greater than the threshold, for example, the two bodies are completely overlapped with each other and the overlapping area is the largest. In this case, the electronic device is in the standby state or the power-off state. When the two bodies are in the second relative position, the overlapping area of the two bodies are the smallest. For example, if the second body is the keyboard, the exposing area of the keyboard is the largest when the two bodies are in the second relative position. In this case, the electronic device is in use (e.g., in the power-on state or an operation state).

Consistent with some of the above embodiments, based on the shape of the bodies and the structural features of the sliding device, the trigger device can be placed on the outer surface of the first body, or on the sliding device. For example, a first sliding end of the sliding device may include a sliding rod at the first end portion of the first body and a sliding seat at the third end portion of the second body. Correspondingly, a second sliding end of the sliding device may include a sliding rod at second end portion of the first body and a sliding seat at the fourth end portion of the second body. The trigger device may be placed on the outer surface of the first body. The trigger device may be placed at the sliding rod at the first body. In this case, sliding of the first body can trigger the trigger device to generate a trigger instruction. The electronic device can be switched to a corresponding state according to the trigger instruction. When the user slides the electronic device, the electronic device can be switched to the power-on state, the standby state, or the power-off state, etc., at the same time, thereby saving the wait time of the user and improving the user experience, without affecting the appearance layout of the electronic device with the existing sliding function.

Figure 6:
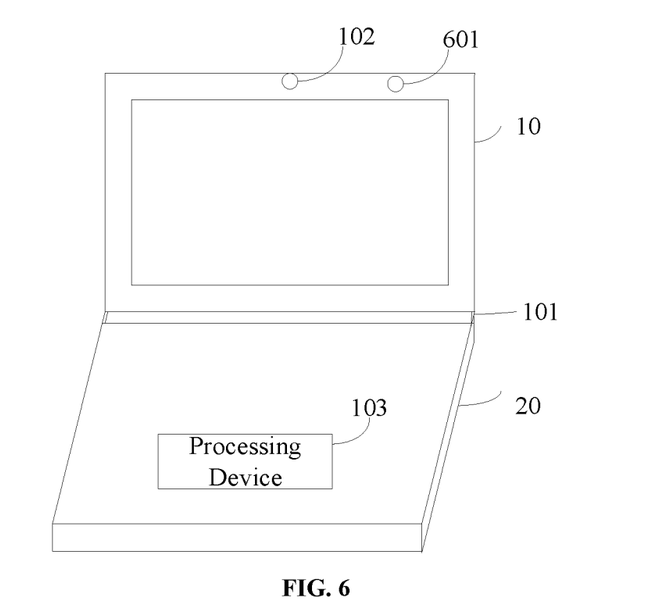
FIG. 6 is a schematic structural diagram of an electronic device according to some embodiments of the present disclosure.

FIG. 6 is a schematic structural diagram of an electronic device according to some embodiments of the present disclosure. The electronic device includes a first body 10, a second body 20, a connecting device 101, a trigger device 102, a processing device 103, and a detecting device 601.

The trigger device 102 can be configured to generate a trigger instruction. The detecting device 601 can be configured to detect a relative movement (e.g., a movement of one of the first body 10 and the second body 20 relative to another) of the first body 10 and the second body 20, and generate a trigger parameter based on the relative movement.

The processing device 103 can be configured to switch the electronic device from a first state to a second state in response to at least the trigger instruction and the trigger parameter.

In some embodiments, the detecting device 601 generates the trigger parameter by detecting the relative movement of the first body 10 and the second body 20. As such, switching of the power consumption state of the electronic device by the processing device 103 caused by the erroneous operation can be prevented. For example, the detecting device 601 can determine the relative movement (e.g., the movement of one of the two bodies relative to another) between the two bodies by detecting a change in a relative distance between the two bodies or a relative angle between the two bodies, and generate the trigger parameter based on the relative movement. The trigger parameter may include an angle parameter or a distance parameter of the two bodies. The detecting device 601 may be placed on the body of the electronic device, or may be placed on the connecting device of the two bodies of the electronic device. The detecting device may include one or more of a gravity sensor, a distance measuring sensor, a photoelectric sensor, etc. These sensors can be configured to detect the relative movement (e.g., the movement of one of the two bodies relative to another) between the two bodies. The present disclosure does not limit the type of the sensors. The two bodies can reach a target position from an initial position through the relative movement.

The trigger parameter may be parameters corresponding to the target position, or parameters collected in a real time manner during the process that the two bodies is changed from the initial position to the target position.

For example, the detecting device 601 can be an infrared distance sensor. If the detecting device 601 is placed on the first body, the distance between the second body to the first body can be measured based on a principle that an intensity of the reflected IR signal varies when the distance between the second body to the first body changes. As such, the relative distance between the first body and the second body can be measured to obtain the relative movement, thereby generating the trigger parameter.

For example, the first body and the second body are connected by a connecting device, the connecting device has a rotating shaft structure, the detecting device 601 can be an angle sensor, and the detecting device 601 can be placed at the rotating shaft. The angle sensor can reflect rotation of the rotating shaft, for example, the rotation of the rotating shaft can be detected according to the change of a count value of the angle sensor. The relative movement (e.g., the movement of one of the two bodies relative to another) between the two bodies can be detected through the angle sensor, thereby generating the trigger parameter.

In some embodiments, the processing device 103 may be in a multi-processing mode. In response to the trigger instruction of the trigger device 102 and the trigger parameter of the detecting device 601, and processing device 103 can simultaneously determine the switching of the power consumption state of the electronic device based on the two aspects. For example, the trigger parameter generated by the detecting device 601 may include angle parameters of the two bodies, e.g., a first angle parameter is 0 and a second angle parameter is 10. Thus, a change of the angle between the two bodies is 10, which indicates the two bodies are opened by too small an angle. In this case, even if the processing device 103 received the trigger instruction from the trigger device 102 (e.g., a touch control instruction from a touch control device), the processing device 103 does not respond to the trigger instruction to switch the power consumption state of the electronic device, because the trigger parameter generated by the detecting device does not meet a preset state-switching parameter requirement. The trigger device and the detecting device are both coupled to the processing device. The connection mode is only an example of the connection mode in the embodiment, and there may be other connection modes, as long as the trigger instruction and the trigger parameter can be sent to the processing device 103.

Figure 7:
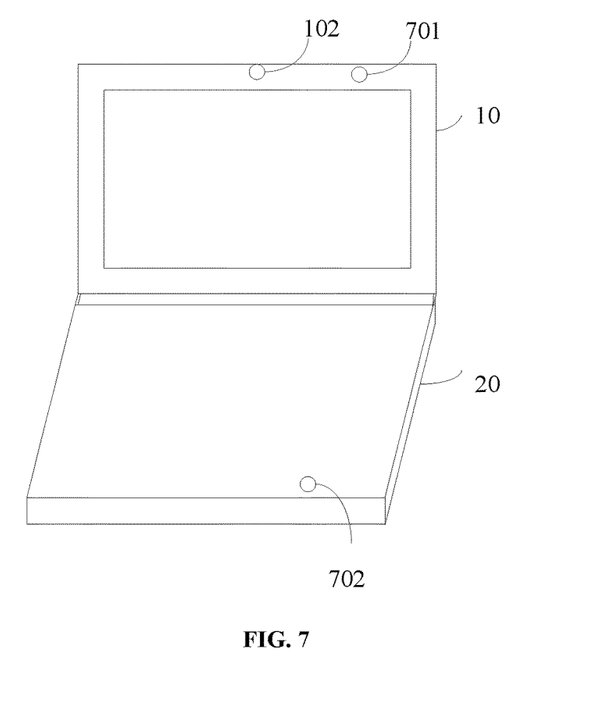
FIG. 7 is a schematic structural diagram of an electronic device according to some other embodiments of the present disclosure.

In some other embodiments, referring to FIG. 7, the electronic device of the present disclosure may include a first body 10, a second body 20, and a trigger device 102. There may be two detecting devices, for example, a first detecting device 701 and a second detecting device 702.

The first detecting device 701 is placed on the first body 10, and the second detecting device 702 is placed on the second body 20.

When the first body moves relative to the second body, the first detecting device 701 can be configured to detect a first parameter of the first body 10, and the second detecting device 702 can be configured to detect a second parameter of the second body 20. The first parameter and the second parameter can be used to determine a trigger parameter.

In the embodiment, two detecting devices provided in the electronic device are configured to respectively detect the first body and the second body when the first body 10 moves relative to the second body 20, so that the trigger parameters can be determined.

The first body 10 and the second body 20 can be configured to detect a movement of the first detecting device 701 and a movement of the second detecting device 702, respectively. The relative movement (e.g., the movement of one of the two bodies relative to another) between the two bodies according to the movement of the first detecting device 701 and the movement of the second detecting device 702. For example, when the overlapping area of the two bodies is the largest and the two bodies are moved by the external force at the same time, the first detecting device 701 and the second detecting device 702 can detect movement data (e.g., the first parameter) of the first body 10 and movement data (e.g., the second parameter) of the second body 20. When it is determined that the first body is moving in a positive direction along a certain direction, and the second body is moving in a negative direction along that direction, and it can be determined that the first body 10 is moving away relative to the second body 20. As such, the trigger parameter of the relative movement can be determined. The first detecting device 701 and the second detecting device 702 may include a gravity sensor or other sensors, which is not limited herein.

For example, when taking out a laptop from a laptop backpack, the user may use two hands to separate the two bodies, and the positions of the two bodies are changed. The first detecting device 701 may include the gravity sensor. According to the acceleration caused by the gravity, a tilt angle of the first body 10 relative to a horizontal plane can be calculated. The first detecting device 701 can analyze the acceleration dynamically during the change of the position, the movement mode of the first body 10 can be determined, and the first parameter can be obtained. Similarly, the second detecting device 702 can determine the movement mode of the second body 20, and the second parameter can be obtained. According to the first parameter and the second parameter, the relative movement (e.g., the movement of one of the two bodies relative to another) between the two bodies can be determined and the trigger parameter can be determined. As such, an accurate and fast detection of the relative movement (e.g., the movement of one of the two bodies relative to another) between the two bodies can be realized. If during the process of the relative movement between the first body and the second body, the position of the second body is not changed, the second detecting device can generate the second parameter during the process.

In some other embodiments of the present disclosure, the detecting device may also be placed at the connecting device. When the first body is moved relative to the second body, the detecting device can be configured to obtain a third parameter of the connecting device and determine the trigger parameter. For example, the connecting device can trigger the detecting device to detect to obtain the trigger parameter. The second body of the electronic device can be moved relative to the first body via the connecting device. Thus, when the positions of the two bodies are changed, the connecting device may also change correspondingly.

For example, the connecting device may be a rotating shaft structure. When the positions of the two bodies of the electronic device change, the rotating shaft may rotate correspondingly. The detecting device placed at the rotating shaft can detect a parameter of the rotating shaft, and determine the trigger parameter of the two bodies during the relative movement according to the parameter of the rotating shaft. If the connecting device is a sliding structure, when the positions of the two bodies of the electronic device change, the sliding structure may slide correspondingly. The detecting device can be drive by sliding to perform detection. The detecting device placed at the connecting device can realize a simpler structure, and a more accurate trigger.

In some embodiments, the trigger device in the embodiment of the present disclosure includes at least one of the following: a pressure sensing device configured to generate a trigger instruction in response to a pressure; or a touch sensing device configured to generate trigger command in response to a touch operation.

The pressure sensing device can be understood as a mechanical switch structure. The trigger instruction can be generated by pressing the pressure sensing device, which can prevent a malfunction of the user. For example, if the user unconsciously presses the pressure sensing device with a pressure and the pressure is smaller than a preset pressure threshold, the pressure sensing device does not generate the trigger instruction.

The touch sensing device can be one or more of a capacitive touch device, a voltage touch device, an infrared touch device, and an ultrasonic touch device. When the touch sensing device is touched, the trigger instruction can be generated, and an anti-mistaken touching operation may be set. For example, a response threshold may be set for touch operation. If the touch response parameter is smaller than the response threshold when the user mistakenly touches the touch sensing device, the touch sensing device does not generate the trigger instruction.

In some embodiments of the present disclosure, the trigger device may generate only the trigger instruction, for example, the trigger instruction for switching the power consumption state. In some other embodiments, the trigger device may generate other touch instruction. In order to improve the security of the electronic device, a detecting device capable of recognizing a biometric feature of the user may be provided to the electronic device. The unlocking of the electronic device can be realized by detecting the biometric feature of the user. Therefore, in order to improve the portability of the device, reduce the cost, and improve the layout of the electronic device, the function of detecting the user's contact-type biometrics feature can be implemented by the trigger device consistent with some embodiments of the present disclosure. For example, the trigger device can be configured to detect the fingerprint information of the user, so as to realize the unlocking of the electronic device. The trigger device can generate not only the trigger instruction in response to the power consumption state switching, but also biometric detection signal in response to the user's touch.

Figure 8:
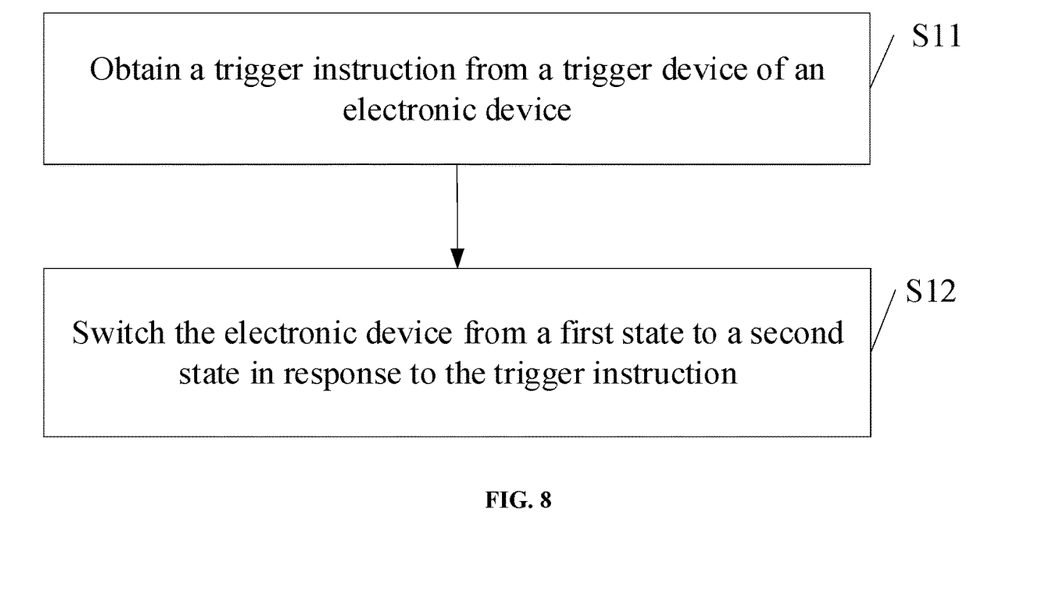
FIG. 8 is a schematic flowchart of a control method according to some embodiments of the present disclosure.

FIG. 8 is a schematic flowchart of a control method according to some embodiments of the present disclosure. The method may include the following steps.

At S11, the electronic device obtains a trigger instruction from a trigger device on an electronic device.

The trigger device is placed in a preset area of the electronic device. The electronic device includes a first body and a second body coupled to the first body via a connecting device. The second body is rotatable relative to the first body via the connecting device, and the preset area is an area that when subjected to an external force enables the first body and the second body to move relative to each other.

At S12, the electronic device is switched from a first state to a second state in response to the trigger instruction, where a power consumption state of the first state is different from a power consumption state of the second state.

It should be noted that the preset area for setting the trigger device may be different according to different structures of the electronic device. Reference can be made to the foregoing detailed description of the electronic device embodiments, and details are not described herein.

The power consumption state of the first state is different from the power consumption state of the second state. When using the electronic device, according to the demand of the user, the user can adjust a preset operation of the first state and the second state. For example, the first state may be a power-off state, and the second state may be a power-on state or a standby state, or a state in which a certain program or interface is specified to ran. If the first state is the power-on state, the second state may be the power-off state, standby state, sleep state, or other user preset state that is different from the power-on state. This allows users to feel the humanized design. When the trigger device is triggered by the user, the electronic device can be switched from a current state to a preset power consumption state. The user does not need to change the relative movement (e.g., the movement of one of the two bodies relative to another) between the two bodies and then trigger the switch of the power consumption state, thereby achieving an unified completion of the two processes, saving the user's wait time.

Figure 9:
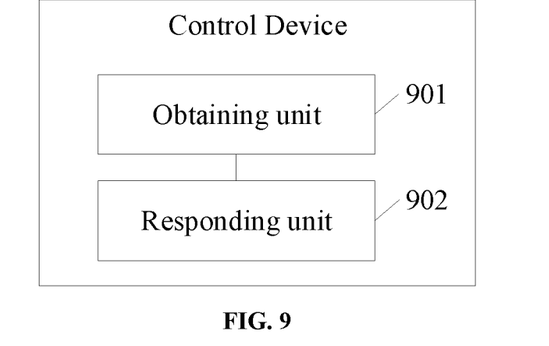
FIG. 9 is a schematic structural diagram of a control device according to some embodiment of the present disclosure.

Referring to FIG. 9, the present disclosure provides a control device according to some embodiments of the present disclosure. The control device includes an obtaining unit 901 and a responding unit 902. The obtaining unit 901 is configured to obtain a trigger instruction for a trigger device on the electronic device. The trigger device is placed in a preset area of an electronic device. The electronic device includes a first body and a second body connected to the first body via a connecting device. The second body is movable relative to the first body via the connecting device. The preset area is an area capable of causing the first body to move relative to the second body after being subjected to an external force. The responding unit 902 is configured to switch the electronic device from the first state to the second state in response to the trigger instruction, wherein the power consumption state of the first state is different from the power consumption state of the second state.

The electronic device consistent with the above embodiments of the present disclosure includes a trigger device. The trigger device is placed on an area that after subjected to an external force can cause a first body of the electronic device and a second body of the electronic device to move relative to each other. A Trigger instruction can be generated by the trigger device when the two bodies (the first body and the second body) of the electronic device switches their positions, and the trigger instruction can case the power consumption state of the electronic device to be switched. As such, the switching between relative positions of the two bodies and the switch between the power consumption states can be trigged by one trigger operation. Therefore, users' wait time can be reduced, thereby improving users' experience.

It should be noted that each embodiment in the specification is described in a progressive manner, and each embodiment focuses on differences from other embodiments, and the same similar parts between the embodiments can be referred to each other. For the device type embodiments, since they are basically similar to the method embodiments, the description is relatively simple, and the relevant parts can be referred to the description of the method embodiments.

In addition, it should be noted that, in the above embodiments, relational terms such as first, second, etc. are only used to distinguish one operation, unit or module from another operation, unit or module. It is not required or implied that any such actual relationship or order exists between the elements, operations or modules. Furthermore, the terms "comprising," "including," or any other variations thereof is intended to encompass a non-exclusive inclusion. As such, a process, method, or system including a series of elements includes not only these elements, but also other elements not explicitly listed, or elements that are inherent to such process, method, or such system. An element that is defined by the phrase "comprising an element" does not exclude the presence of additional equivalent elements in the process, method or system including the element.

The above only describes some embodiments of the present disclosure. It should be noted that those skilled in the art can also make improvements and modifications without departing from the principles of the present disclosure. These improvements and modifications are within the scope of protection of the present disclosure.

What is claimed is:

1. An electronic device comprising:
   a first body;
   a second body coupled to the first body;
   a trigger device configured to generate a trigger instruction based on a trigger operation;
   wherein the trigger device is placed in an area responsive to a movement of the first body relative to the second body, the area is determined according to a utilization rate of an external force acting on the first body, and the utilization rate corresponds to an amplitude of a position change of the first body when it is subjected to the external force;
   a fingerprint recognition device configured to perform fingerprint recognition, the trigger device being integrated together with the fingerprint recognition device, wherein the fingerprint recognition and generation of the trigger instruction are performed simultaneously; and
   a processing device configured to switch the electronic device from a first state to a second state in response to the trigger instruction, wherein a power consumption state of the first state is different from a power consumption state of the second state.

2. The electronic device according to claim 1, wherein:
   the trigger device is placed in the area that enables the first body and the second body to move relative to each other when subjected to an external force.

3. The electronic device according to claim 1, further comprising:
   a connecting device connected to the first body and configured to allow the first body to move relative to the second body via the connecting device.

4. The device according to claim 3, wherein:
   the connecting device comprises a rotating device;
   the rotating device is coupled to the first portion of the first body, enabling the first body to rotate relative to the second body via the rotating device; and
   the trigger device is placed at a second portion of the first body, the second portion and the first portion meeting a relative position requirement.

5. The device according to claim 4, wherein:
   the first body is of a plane shape, the first portion is a first side portion of the first body, and the second portion is a second side portion corresponding to the first side portion; and
   the second body is of a plane shape, and the second body includes a third side portion.

6. The device according to claim 5, wherein:
   the rotating device is respectively coupled to the first side portion and the third side portion to enable the first body to rotate relative to the second body via the rotating device.

7. The device according to claim 6, wherein:
   the movement of the first body relative to the second body comprises the two bodies moving from a first relative position to a second relative position, the first relative position being a position in which an angle between the first body and the second body is smaller than a threshold, and the second relative position being a position in which the angle between the first body and the second body is larger than the threshold.

8. The device according to claim 7, wherein:
   a first power consumption of the first state is less than a second power consumption of the second state.

9. The device according to claim 8, wherein:
   the first body comprises a display device;
   when in the second relative position, the display device is in an exposed state; and
   the trigger device is placed on a surface of the second side portion.

10. The device according to claim 9, wherein the trigger device comprises:
    a first trigger device placed on the surface of the second side portion, the first trigger device being configured to generate a first trigger instruction for switching the electronic device to a state in which power consumption is increased; and a second trigger device placed on the second side portion but not on the surface of the second portion, the second trigger device being configured to generate a second trigger instruction to switch the electronic device to a state in which power consumption is reduced.

11. The device according to claim 1, further comprising:

a locking device comprising the trigger device, the locking device being placed at a second side portion of the first body; and a coupling device located on a fourth side portion of the second body corresponding to the second side portion of the first body; wherein:

the locking device cooperates with the coupling device to lock in an overlapping relationship between the first body and the second body when the first body is overlapped with the second body, and to prevent the first body from rotating relative to the second body; and the locking device is configured to switch from a first position to a second position when subjected to an external force.

12. The device according to claim 11, wherein:

in the first position, the first body and the second body are locked; and in the second position, the first body and the second body are released from being locked.

13. The device according to claim 1, wherein the connecting device comprises a sliding device respectively connected to the first body and the second body, enabling the first body to slide relative to the second body via the sliding device; and the trigger device is placed on an outer surface of the first body.

14. The device according to claim 13, wherein trigger device comprises:

a first trigger device placed on a first outer surface of the first body, the first trigger device is configured to correspond a first position to a starting point of a first sliding direction and to generate a first trigger instruction for switching the electronic device to a state of increased power consumption; and a second trigger device placed on the second outer surface of the first body and configured to correspond a second position to a starting point of a second sliding direction and to generate a second trigger instruction for switching the electronic device to a state of reduced power consumption.

15. The device according to claim 1, further comprising:

a detecting device configured to detect the movement of the first body relative to the second body to generate a trigger parameter based on the movement.

16. The device according to claim 15, further comprising:

the processing device configured to switch the electronic device from the first state to the second state according to the trigger instruction and the trigger parameter.

17. The device according to claim 16, wherein the detecting device comprises:

a first detecting device placed on the first body; and a second detecting device placed on the second body, wherein in response to the first body moving relative to the second body:

the first detecting device is configured to obtain a first parameter of the first body, and the second detecting device is configured to obtain a second parameter of the second body, and the trigger parameter is determined according to the first parameter and the second parameter.

18. The device according to claim 16, wherein:

the detecting device is placed on the connecting device, and configured to detect a parameter of the connecting device and determine the trigger parameter according to the parameter in response to the first body moving relative to the second body.

19. A control method comprising:

obtaining a trigger instruction from a trigger device of an electronic device, wherein the electronic device includes a first body and a second body coupled to the first body, the trigger device is placed in an area responsive to a movement of the first body and the second body, the area is determined according to a utilization rate of an external force acting on the first body, the utilization rate corresponds to an amplitude of a position change of the first body when it is subjected to the external force, the trigger device is integrated together with a fingerprint recognition device, which is configured to perform fingerprint recognition, and the trigger device is triggered to generate the trigger instruction at a same time when the fingerprint recognition is completed; and switching the electronic device from a first state to a second state in response to the trigger instruction, wherein a power consumption state of the first state is different from a power consumption state of the second state.

20. The device according to claim 1, wherein the trigger device further includes:

a first trigger device configured to generate a first trigger instruction for switching the electronic device from a power-on state to a power-off state;

a second trigger device configured to generate a second trigger instruction for switching the electronic device from the power-off state to the power-on state; and a third trigger device configured to generate a third trigger instruction for switching the electronic device from the power-on state to a standby state.

* * * * *